(12) United States Patent
Cardinal et al.

(10) Patent No.: US 10,771,485 B2
(45) Date of Patent: Sep. 8, 2020

(54) SYSTEMS AND METHODS FOR CROSS-CHANNEL ELECTRONIC COMMUNICATION SECURITY WITH DYNAMIC TARGETING

(71) Applicant: BANK OF AMERICA CORPORATION, Charlotte, NC (US)

(72) Inventors: Donald Joseph Cardinal, Celina, TX (US); Shane Edward Asher, San Antonio, TX (US); Travis John Hicks, Cedar Park, TX (US); Guy Vernon Pearson, Jr., Columbia, MD (US); Christopher Daniel Birch, Dayton, OH (US); Shannon Sabina Willis, Pineville, NC (US); Todd Anthony Smialek, Fort Mill, SC (US); Corey Scott Gillespie, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 204 days.

(21) Appl. No.: 16/033,995

(22) Filed: Jul. 12, 2018

(65) Prior Publication Data
US 2020/0021606 A1 Jan. 16, 2020

(51) Int. Cl.
*H04L 29/06* (2006.01)
(52) U.S. Cl.
CPC ......... *H04L 63/1416* (2013.01); *H04L 63/08* (2013.01); *H04L 63/1425* (2013.01); *H04L 63/1433* (2013.01); *H04L 63/1483* (2013.01)

(58) Field of Classification Search
CPC .................................................. H04L 63/1416
See application file for complete search history.

(56) References Cited

U.S. PATENT DOCUMENTS

| | | | |
|---|---|---|---|
| 6,954,858 B1 | 10/2005 | Welborn et al. | |
| 7,092,861 B1 | 8/2006 | Shteyn | |
| 7,325,252 B2 * | 1/2008 | Bunker, V | ............. H04L 43/00 726/23 |
| 8,146,164 B2 | 3/2012 | Eshun et al. | |

(Continued)

*Primary Examiner* — Simon P Kanaan
(74) *Attorney, Agent, or Firm* — Michael A. Springs; Moore & Van Allen PLLC; Vaidehi Bachoti

(57) ABSTRACT

Embodiments of the invention are directed to a system, method, or computer program product for cross-channel electronic communication security. In this regard, the invention provides dynamic construction and targeting of adaptive simulated malicious electronic communications for unsecure communication identification by a user. The invention configures adaptive simulated malicious electronic communications for interacting with users via user interfaces of the multiple electronic communication media and user devices. Another aspect of the invention is directed to configuring, dynamically and in real time, a simulated malicious electronic communication for one electronic communication medium, based on and in response to, user actions on another simulated malicious electronic communication on another electronic communication medium. Another aspect of the invention is directed to escalating, in real-time, a level of authentication required for the user to execute the user activity based on user actions performed on the simulated malicious electronic communications.

20 Claims, 5 Drawing Sheets

(56) References Cited

U.S. PATENT DOCUMENTS

| | | | |
|---|---|---|---|
| 8,782,745 B2* | 7/2014 | Stevens | H04W 12/12 |
| | | | 726/4 |
| 8,918,872 B2 | 12/2014 | Kumar et al. | |
| 9,065,826 B2 | 6/2015 | Colvin et al. | |
| 9,280,911 B2 | 3/2016 | Sadeh-Koniecpol et al. | |
| 9,373,267 B2* | 6/2016 | Sadeh-Koniecpol | G09B 5/00 |
| 9,398,029 B2 | 7/2016 | Sadeh-Koniecpol et al. | |
| 9,547,998 B2 | 1/2017 | Sadeh-Koniecpol et al. | |
| 9,558,677 B2 | 1/2017 | Sadeh-Koniecpol et al. | |
| 9,606,893 B2 | 3/2017 | Gupta et al. | |
| 9,813,454 B2 | 11/2017 | Sadeh-Koniecpol et al. | |
| 9,870,715 B2 | 1/2018 | Sadeh-Koniecpol et al. | |
| 2002/0066028 A1 | 5/2002 | Welborn et al. | |
| 2005/0183143 A1 | 8/2005 | Anderholm et al. | |
| 2007/0226796 A1 | 9/2007 | Gilbert et al. | |
| 2008/0288330 A1 | 11/2008 | Hildebrand et al. | |
| 2010/0146615 A1* | 6/2010 | Locasto | H04L 63/1408 |
| | | | 726/11 |
| 2010/0235918 A1 | 9/2010 | Mizrahi et al. | |
| 2013/0247187 A1* | 9/2013 | Hsiao | G06F 21/554 |
| | | | 726/22 |
| 2013/0304676 A1 | 11/2013 | Gupta et al. | |
| 2013/0312094 A1* | 11/2013 | Zecheru | G06F 21/577 |
| | | | 726/23 |
| 2016/0180735 A1 | 6/2016 | Clark et al. | |

\* cited by examiner

SYSTEMS AND METHODS FOR CROSS-CHANNEL ELECTRONIC COMMUNICATION SECURITY WITH DYNAMIC TARGETING

FIELD OF THE INVENTION

In general, the present invention is directed to dynamic assessment, customization and construction of adaptive simulated electronic communications for unsecure and malicious communication identification. Furthermore, the present invention embraces a novel, proactive approach to safeguarding user information by dynamically escalating authentication requirements.

BACKGROUND

Over the last few years, there has been a significant increase in the number of electronic activities, particularly online and mobile activities due to widespread use of smartphone, tablet computers, laptop computers and electronic computing devices in general. These electronic activities are typically entail a multitude of electronic communications that are received at and sent form a variety of communication media, systems and networks. However, the multitude of electronic communications may comprise unsecure or malicious electronic communications whose veracity cannot be easily confirmed by users before the unsecure or malicious electronic communications initiate unauthorized actions that may jeopardize the security and safety of users' electronic information and that of user devices. Therefore, proactively identifying unsecure or malicious electronic communications is crucial for preventing unauthorized exposure of users' electronic information and ensuring the security of user devices. The present invention provides a novel method of dynamically constructing, customizing and targeting adaptive simulated malicious electronic communications to users for unsecure communication identification, in real-time across a plurality of communication channels and media, which provides a solution to the problem of identifying unsecure or malicious electronic communications before they cause unauthorized actions.

The previous discussion of the background to the invention is provided for illustrative purposes only and is not an acknowledgement or admission that any of the material referred to is or was part of the common general knowledge as at the priority date of the application.

SUMMARY

In one aspect, the present invention is directed to in general a system, method and computer program product for cross-channel electronic communication security. The system is configured to provide dynamic construction and targeting of adaptive simulated malicious electronic communications for unsecure communication identification. The system is typically configured for facilitating training of users for the purposes of identifying unsecure and malicious electronic communications, and further customizing and tailoring subsequent simulations based on unsuccessful or successful identification of simulated malicious electronic communications by the user. The system typically includes at least one processing device operatively coupled to at least one memory device and at least one communication device configured to establish operative communication with a plurality of networked devices via a communication network. The system also typically includes a module stored in the at least one memory device comprising executable instructions that when executed cause the processing device and hence the system to perform one or more functions described below. In some embodiments, the system is configured to: construct a first simulated malicious electronic communication for a user, wherein the first simulated malicious electronic communication is associated with a first electronic communication medium, wherein constructing the first simulated malicious electronic communication comprises: embedding an action tag in a body of the first simulated malicious electronic communication, wherein the action tag is structured for determining a predetermined user action associated with the first simulated malicious electronic communication. Moreover, the system is configured to transmit, via a first communication channel, the first simulated malicious electronic communication to a first user device associated with the first electronic communication medium and determine, via the embedded action tag, a first user action performed by the user on the first simulated malicious electronic communication. Subsequently, the system may then construct a second simulated malicious electronic communication for the user based on the first user action, wherein constructing the second simulated malicious electronic communication comprises constructing the second simulated malicious electronic communication such that the second simulated malicious electronic communication is associated with a second electronic communication medium; and transmit, via a second communication channel associated with the second electronic communication medium, the second simulated malicious electronic communication to the user.

In some embodiments, or in combination with any of the previous embodiments, the action tag comprises a tracking pixel.

In some embodiments, or in combination with any of the previous embodiments, the invention (system, computerized method, and computer program product) may be further configured to: identify an unsecure portion of a malicious electronic communication, wherein the unsecure portion is associated with an unauthorized activity, wherein the unsecure portion is associated with a predetermined malicious component type; and construct a simulated unsecure component based on the unsecure portion such that the simulated unsecure component is (i) associated with the predetermined malicious component type and (ii) not associated with the unauthorized activity; wherein constructing the first simulated malicious electronic communication further comprises inserting the simulated unsecure component into the first simulated malicious electronic communication.

In some embodiments, or in combination with any of the previous embodiments, the invention (system, computerized method, and computer program product) may be further configured to: identify a malicious electronic communication associated with an unauthorized activity; determine an electronic communication medium type associated with the malicious electronic communication; and wherein constructing the first simulated malicious electronic communication further comprises constructing the first simulated malicious electronic communication such that the first electronic communication medium matches the electronic communication medium type.

In some embodiments, or in combination with any of the previous embodiments, the invention (system, computerized method, and computer program product) may be further configured to: identify an user electronic communication received by the user at a predetermined prior time interval; determine a current time period of an annual communication cycle; identify an event associated with a future time period following the current time period; and wherein constructing the first simulated malicious electronic communication further comprises constructing the first simulated malicious electronic communication such that the first simulated malicious electronic communication comprises event data associated with the future time period following the current time period.

In some embodiments, or in combination with any of the previous embodiments, constructing the second simulated malicious electronic communication based on the first user action further comprises constructing the second simulated malicious electronic communication such that at least a portion of the second simulated malicious electronic communication matches the first simulated malicious electronic communication.

In some embodiments, or in combination with any of the previous embodiments, constructing the second simulated malicious electronic communication based on the first user action further comprises escalating a predetermined complexity of the second simulated malicious electronic communication.

In some embodiments, or in combination with any of the previous embodiments, the first simulated malicious electronic communication is associated with a spam type communication, wherein escalating the predetermined complexity of the second simulated malicious electronic communication further comprises constructing the second simulated malicious electronic communication such that the second simulated malicious electronic communication is associated with a phish type electronic communication.

In some embodiments, or in combination with any of the previous embodiments, escalating the predetermined complexity of the second simulated malicious electronic communication further comprises: identifying a prior user electronic communication received by the user during a predetermined prior first time interval; determining that the prior user electronic communication is associated with a user activity type and an electronic communication medium type; identifying that the user has initiated a current user activity associated with the user activity type during a second time interval; and based on determining that user has not received an electronic communication of the electronic communication medium type associated with the current user activity, constructing the second simulated malicious electronic communication by at least modifying the prior user electronic communication to include activity data associated with the current user activity.

In some embodiments, or in combination with any of the previous embodiments, escalating the predetermined complexity of the second simulated malicious electronic communication further comprises: identifying an unsecure portion of a malicious electronic communication, wherein the unsecure portion is associated with an unauthorized activity, wherein the unsecure portion is associated with a predetermined malicious component type; constructing a simulated unsecure component based on the unsecure portion such that the simulated unsecure component is (i) associated with the predetermined malicious component type and (ii) not associated with the unauthorized activity; wherein constructing the second simulated malicious electronic communication comprises constructing the second simulated electronic communication to include (i) the simulated unsecure component, and (ii) activity data associated with the current user activity.

In some embodiments, or in combination with any of the previous embodiments, constructing the second simulated malicious electronic communication based on the first user action, further comprises: determining, via the embedded action tag, the first user action performed by the user comprising a unsuccessful identification of the first simulated malicious electronic communication at a first user application; identifying a user request for access to a second user interface associated with a second user application; and escalating authentication requirements of the user for access to the second user interface based on the unsuccessful identification of the first simulated malicious electronic communication.

In some embodiments, or in combination with any of the previous embodiments, the second user interface is associated with the second electronic communication medium, wherein transmitting the second simulated malicious electronic communication to the user comprises presenting the second simulated malicious electronic communication via the second user interface.

In some embodiments, or in combination with any of the previous embodiments, the invention (system, computerized method, and computer program product) may be further configured to: in response to determining the first user action performed by the user on the first simulated malicious electronic communication, initiate a presentation of a training interface indicating a successful or unsuccessful identification of the first simulated malicious electronic communication by the user.

In some embodiments, or in combination with any of the previous embodiments, the invention (system, computerized method, and computer program product) may be further configured to: determine, via the embedded action tag, the first user action performed by the user comprising a unsuccessful identification of the first simulated malicious electronic communication; and in response to determining the unsuccessful identification of the first simulated malicious electronic communication, initiate a presentation of a training interface indicating the unsuccessful identification of the first simulated malicious electronic communication by the user, comprising: initiating a presentation of the first simulated malicious electronic communication; and overlaying a graphical element over a portion of the presentation of the first simulated malicious electronic communication associated with simulated malicious content.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
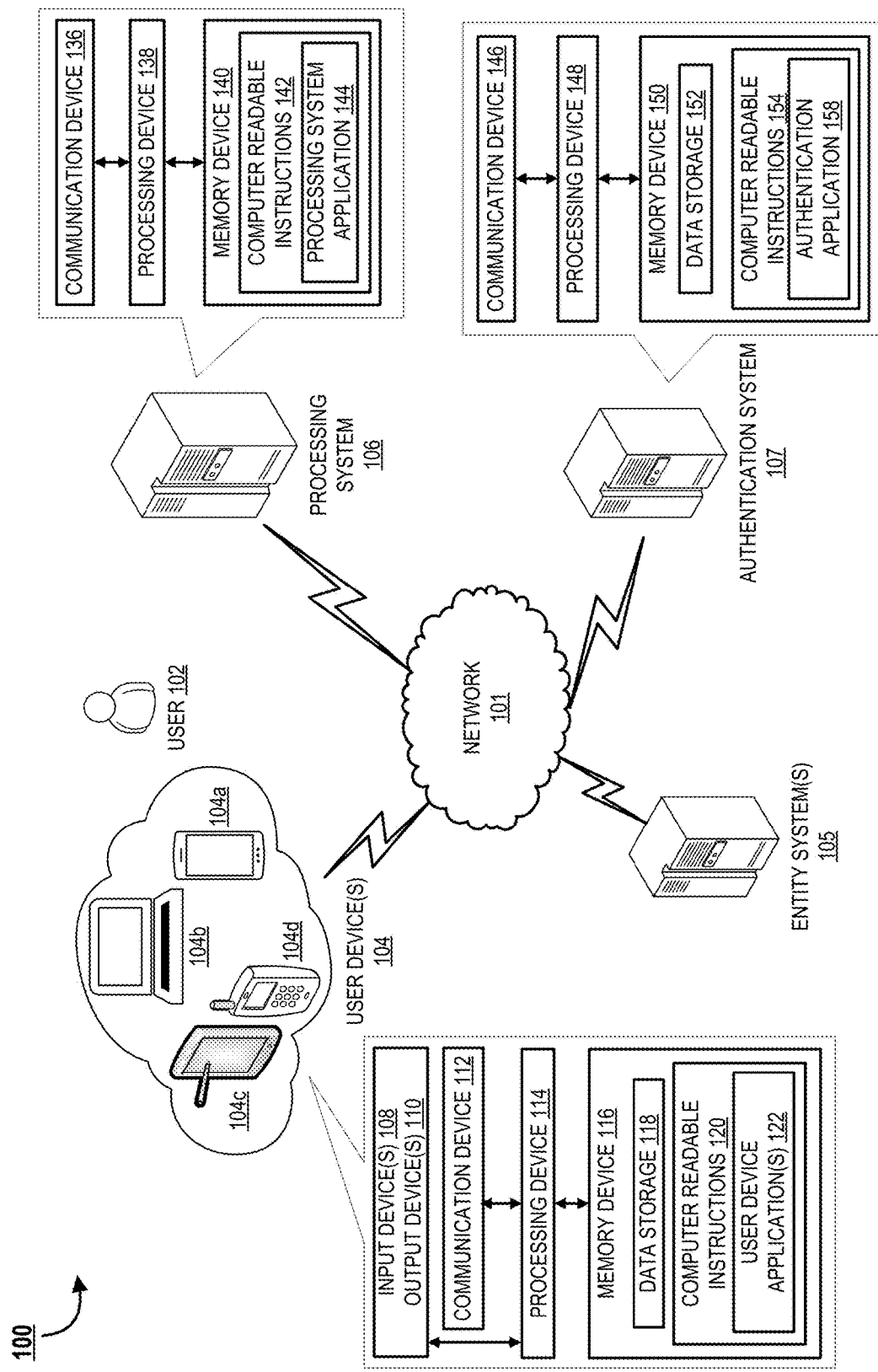
Figure 2:
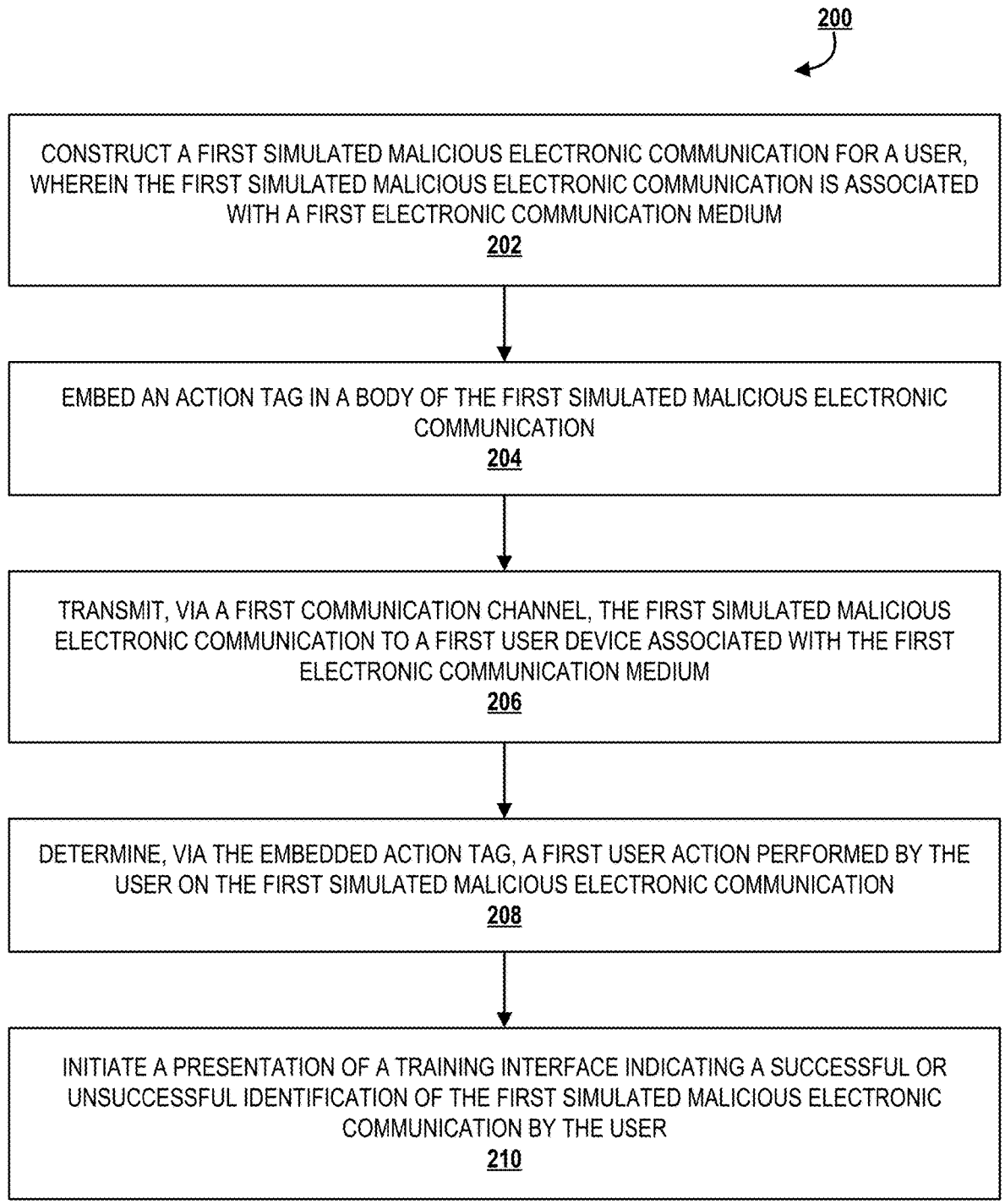
Figure 3:
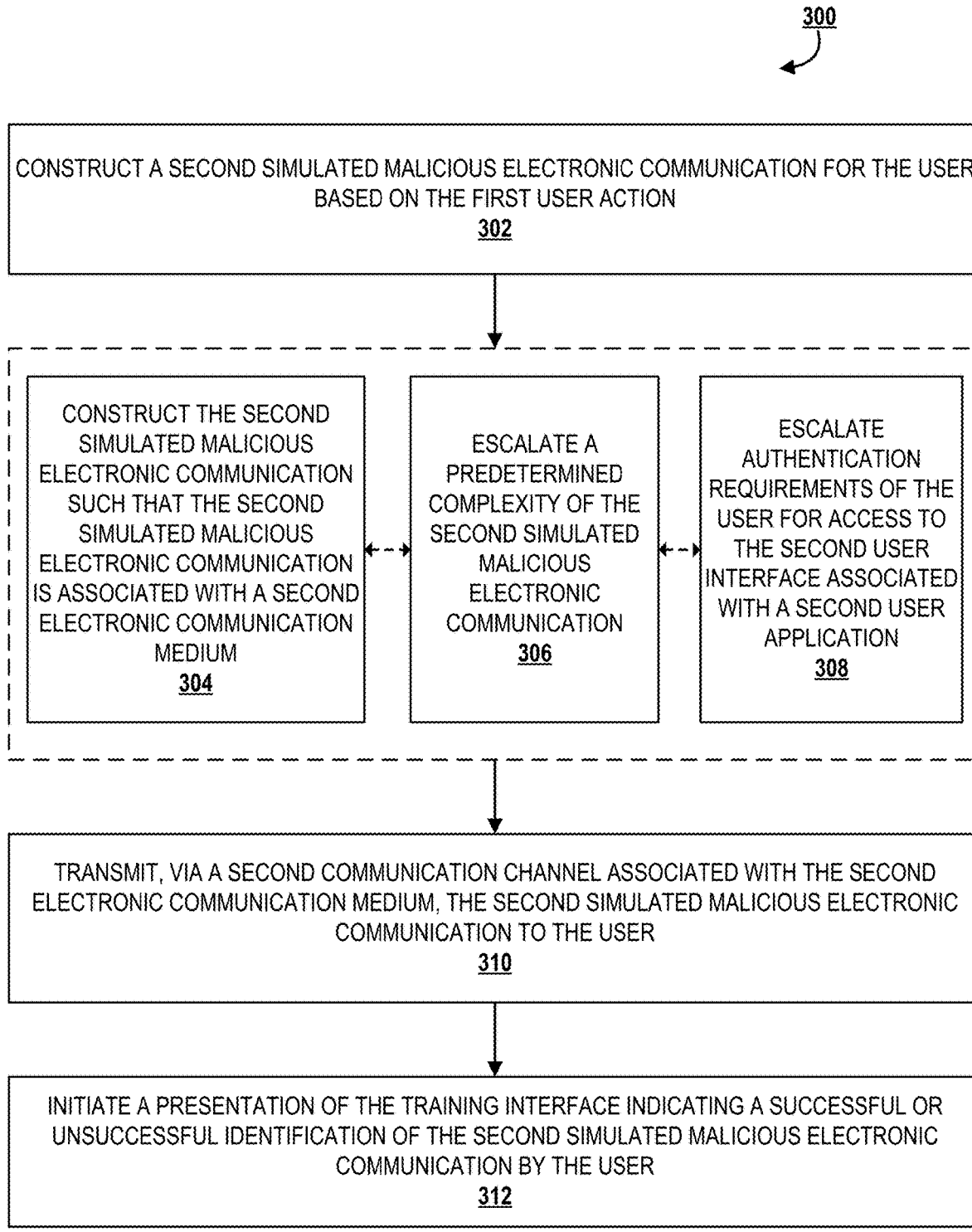
Figure 4A:
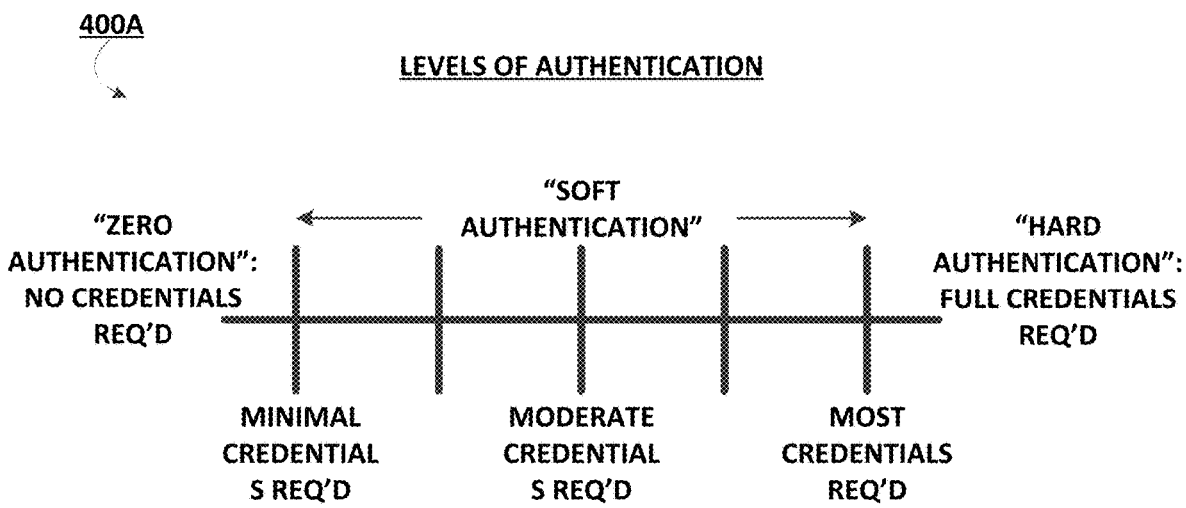
Figure 4B:
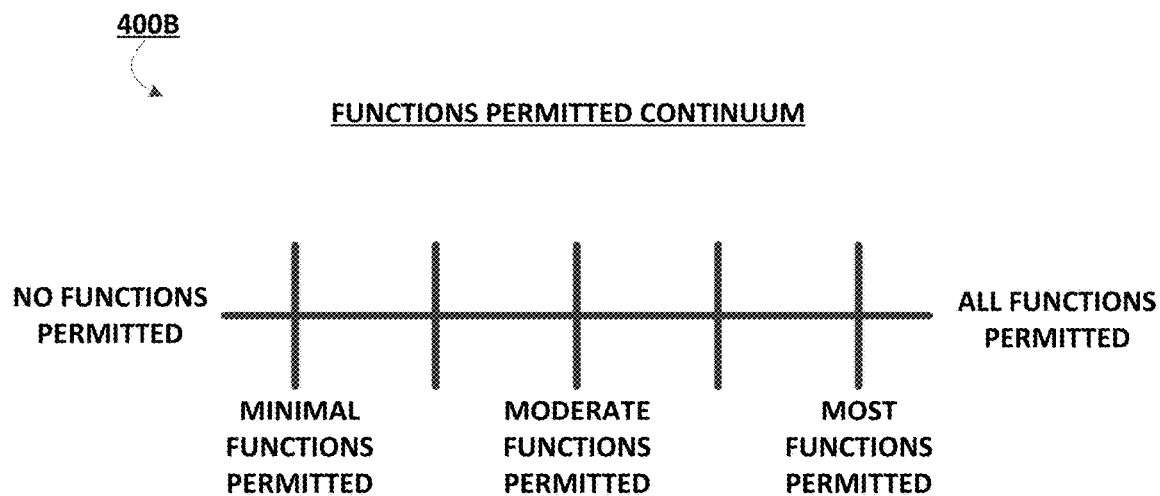
Figure 4C:
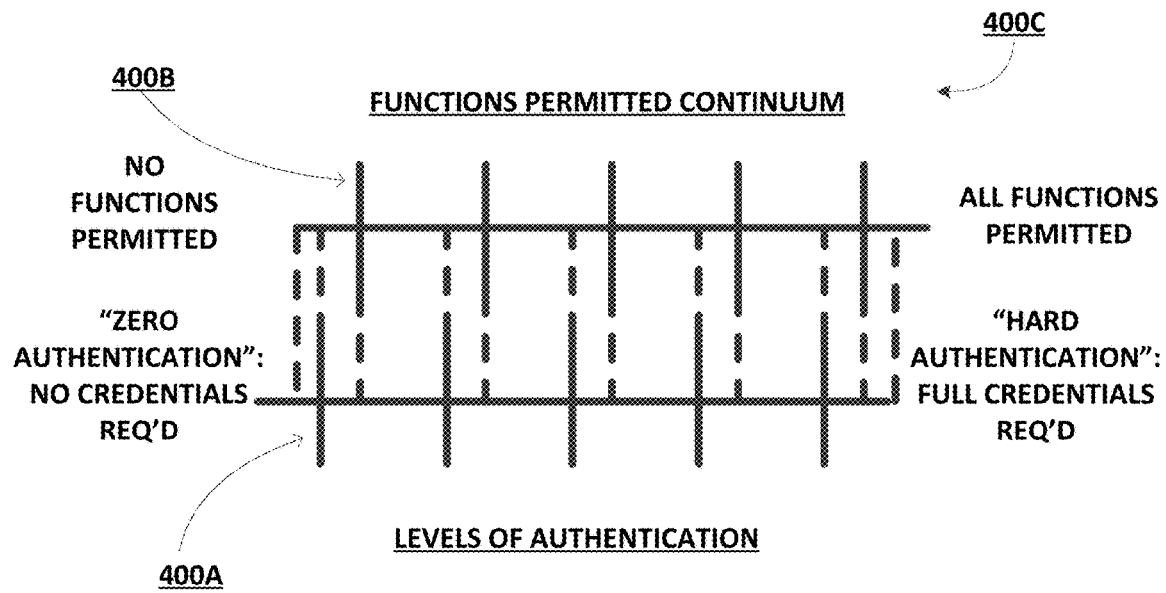
Figure 4D:
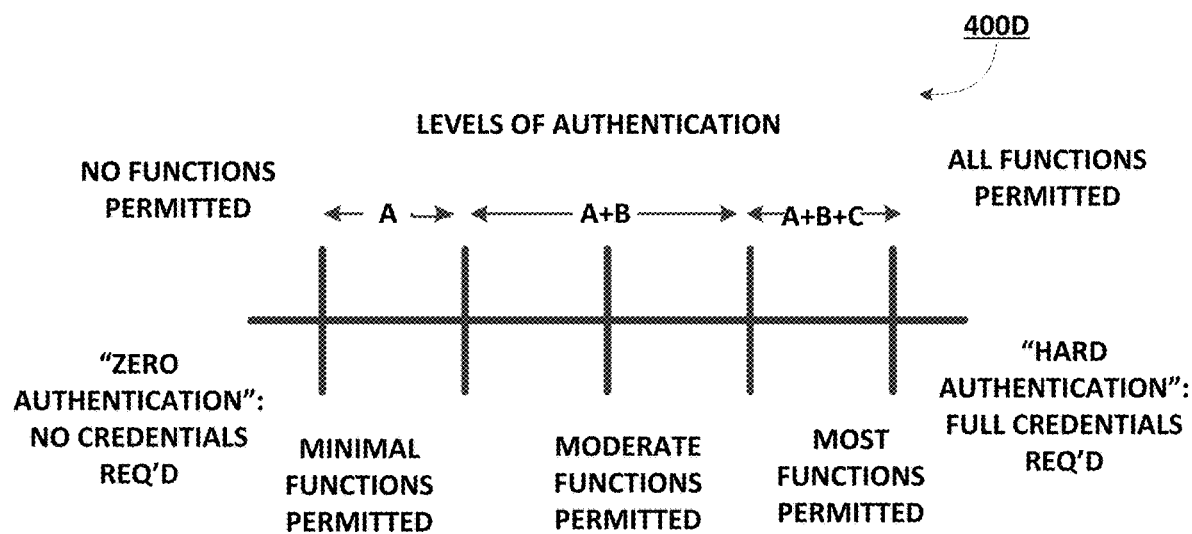

Having thus described embodiments of the invention in general terms, reference will now be made the accompanying drawings, wherein:

FIG. 1 depicts a system environment 100 for cross-channel electronic communication security, in accordance with an aspect of the present invention;

FIG. 2 schematically depicts a high level process flow 200 cross-channel electronic communication security with dynamic targeting, in accordance with some embodiments of the invention;

FIG. 3 schematically depicts a high level process flow 300 cross-channel electronic communication security with dynamic targeting, in accordance with some embodiments of the invention;

FIG. 4A presents an illustration of the authentication continuum in accordance to one embodiment of the invention;

FIG. 4B presents an illustration of the functions permitted continuum in accordance to one embodiment of the invention;

FIG. 4C presents an illustration of the coupling of the functions permitted continuum and the levels of authentication continuum in accordance to one embodiment of the invention; and FIG. 4D presents an illustration of the relationship between the functions permitted and the authentication types in accordance to one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary information associated with the user, or the like. The account is associated with and/or maintained by an entity. In other embodiments, an "entity" may not be a financial institution.

Unless specifically limited by the context, a "user activity", "transaction" or "activity" refers to any communication between the user and a financial institution or another entity. In some embodiments, for example, a user activity may refer to a purchase of goods or services, a return of goods or services, a payment transaction, a credit transaction, or other interaction involving a user's bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building or a dwelling, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity who receives one or more electronic communications. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

An "electronic communication" may refer to an email, a text message, a social media post, a message associated with a messaging application, a user device notification, a notification associated with an application of a user device, a pop-up notification, a communication associated with exchanging messages between users/devices using electronic devices, and/or the like.

With advancements in technology infrastructures and wireless communication implementation, user devices, such as laptop computers, tablet computers, mobile phones, smart phones, wearable devices, smart television, and the like are common. Each user is typically associated with multiple user devices, e.g., a user may be associated with a smart phone, a laptop computer and another smart device (such as a wearable device, a smart television, a tablet device and/or the like). These user devices have the capability to hold large amounts of information, including personal information, resource data (information associated with user resources like banking accounts, payment instruments like credit cards and the like), and/or have access to a central storage of such data. In other aspects the user devices may enable access to resource data stored at other sources and databases based on requisite authorization. These devices may also be configured to enable the user to perform one or more activities, transactions or resource transfers through an application via online banking, mobile banking, mobile wallets and the like.

As such, advancements in technology have facilitated numerous new methods for sending and receiving electronic communications across user devices, from a myriad external sources, servers and systems, and across various communication channels/media (e.g., cloud networks, WAN networks, cellular communication, device applications, third party applications, social media applications, browsers, etc.).

However, the multitude of electronic communications may comprise unsecure or malicious electronic communications whose veracity cannot be easily confirmed by users before the unsecure or malicious electronic communications initiate unauthorized actions (e.g., a breach of security (e.g., a phishing event, a hacking event, etc. where unauthorized access to user information and devices may have been obtained by unauthorized individuals, unbeknownst to the user) adversely affect the security of user information and compromise the security of not just the user device that was breached, but also other connected user devices or other user devices that contain corresponding applications. However, the user may not be aware of a compromise of the user data or user device until the intercepted data is used to perform at least one unauthorized activity/transaction at a later time, while the user's information continues to be at risk, or until an associated entity (e.g., a financial institution, a service provider etc.) informs the user of the compromise of security, by which time unauthorized individuals may have performed unauthorized actions in the meantime using the user's information without the user's knowledge/permission. In such instances, identifying the mode of the exposure and the specific technological parameter that needs to be addressed may be possible, if at all, after a significant time lapse succeeding the unauthorized activity. Here, identification of malicious electronic communications by the user and preventing unauthorized actions is crucial. Hence, a need exists for predictive and proactive cross-channel electronic communication security, and dynamic escalation of authentication in real-time based on user actions, to ensure safety and security of user information.

The present invention provides a solution to the foregoing problems by providing cross-channel electronic communication security system structured for proactively and automatically providing dynamic construction and targeting of adaptive simulated malicious electronic communications for unsecure communication identification. As discussed, each user is typically associated with multiple electronic communications across a multitude of devices and channels/media on a daily basis. Since the methods and modes of intercepting personal information and exposure in electronic activities are greater in number and technically varied the present invention is configured for constructing simulations in a variety of technologies, formats, channels and media, to safeguard personal and financial information and to mitigate exposure of electronic activities across them. The present invention provides novel technology for dynamically constructing unique and customized simulations of malicious communications that aid in training a user to identify real malicious communications. Moreover, the present invention provides novel technology for dynamically constructing and fundamentally transforming electronic communications from one channel/medium to another for a variety of communications media/channels such that the simulations are compatible with the technical specification of the respective medium. In addition, the present invention is further configured for tailoring, transforming and constructing the simulated communications one channel/medium, dynamically and in response to user actions on simulated communications on another channel/medium, thereby improving interconnectivity of simulations presented across various channels/media. These technical improvements and solutions are not possible in the absence of the present invention.

Moreover, the present invention provides a novel solution configured to dynamically assess the authentication requirements, based on the user actions performed on simulated communications, to ensure security and safety of the user's financial and personal information. In such instances of determined potential compromise (e.g., when a user incorrectly identifies a simulated malicious communication as being benign), the system may escalate, in real-time, the required level of authentication from the existing level (for example, a passcode) to a higher level (for example, a fingerprint scan) for executing a certain user activity as long as the parameters associated with the activity deem to require such. In some embodiments, the system may deny/decline the request to execute a user activity based on the foregoing, to safeguard personal information. Finally, the present invention is also configured to dynamically construct, tailor and customize the simulations based on the user information, annual communication cycles, known malicious communications, user actions, and/or the like to construct simulations that are most closely mimic real malicious communications that the user may receive and the medium/channel in which they are most likely to be received, in order to prevent the real malicious communications from jeopardizing the security of user information and devices.

FIG. 1 illustrates a system environment 100 for cross-channel electronic communication security, in accordance with one embodiment of the present invention. FIG. 1 provides a unique system that includes specialized servers and systems, communicably linked across a distributive network required to perform the functions of providing dynamic electronic communication security and simulation paradigms. As illustrated in FIG. 1, a processing system 106 is operatively coupled, via a network 101 to user system(s) 104 (e.g., a plurality of user devices 104a-104d), to an authentication system 107, entity system(s) 105 (e.g., a social media system, a financial institution system, a merchant system, other systems associated with a user 102 and/or other systems/servers associated with electronic communications) and/or other systems not illustrated herein. In this way, the processing system 106 can send information to and receive information from the user device(s) 104, the entity system 105 and the authentication system 107. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves, light waves or any other suitable means.

In some embodiments, the user 102 is an individual that has, owns or is otherwise associated with one or more user devices 104, and typically a plurality of user devices 104, that are structured for receiving electronic communications, that comprise user applications/widgets structured for receiving/displaying electronic communications, and/or that facilitate/allow the user to perform one or more user activities. The user devices typically comprise one or more of a smart phone 104a, a laptop or desktop computer 104b, a mobile phone or a personal digital assistant 104d, a tablet device 104c, wearable smart devices, smart television devices, home controllers, smart speakers, and/or other computing devices. In some embodiments, the user may be associated with a first user device (e.g., the tablet device 104c, a laptop or desktop computer 104b, or another smart/computing device) and a second user device (e.g., the smart phone 104a, or any of the user devices listed above).

FIG. 1 also illustrates a representative user system/device 104. As discussed, the user device(s) 104 may be, for example, a desktop personal computer, a mobile system, such as a cellular phone, smart phone, personal digital assistant (PDA), laptop, or the like, and each of the user devices (e.g., devices 104a-104d) may comprise the technical/electronic components described herein. The user device(s) 104 generally comprises a communication device 112, a processing device 114, a memory device 116, input device(s) 108 and output device(s) 106. The user device 104 may comprise other devices that are not illustrated, configured for location determination/navigation (GPS devices, accelerometers and other positioning/navigation devices), for authentication (fingerprint scanners, microphones, iris scanners, facial recognition devices/software and the like), for image capture (cameras, AR devices, and the like), for display (screens, hologram projectors and the like), and other purposes. The user device 104 is a computing system that enables the user to receive one or more electronic communications and/or perform one or more user activities. The processing device 114 is operatively coupled to the communication device 112, input device(s) 108 (e.g., keypads/keyboards 108a, touch screens 108b, mouse/pointing devices 108c, gesture/speech recognition sensors/devices, microphones, joysticks, authentication credential capture devices listed above, image capture devices, and other peripheral input devices), output device(s) 110 (screens 110a-110b, speakers, printers and other peripheral output devices) and other devices/components of the user device. The processing device 114 uses the communication device 112 to communicate with the network 101 and other devices on the network 101, such as, but not limited to the processing system 106 and the authentication system 107. As such, the communication device 112 generally comprises a modem, server, or other device for communicating with other devices on the network 101.

Each user device 104a-104d, typically comprises one or more user input devices 108, that are configured to receive instructions, commands, data, authentication credentials, audio/visual input and other forms of user input from the user, and transmit the received user input to the processing device 114 of the user device for processing. Similarly, each user device 104a-104d, typically comprises one or more user output devices 110, that are configured to transmit, display (e.g., via a graphical user interface), present, provide or otherwise convey an user output to the user, based on instructions from the processing device 114 of the user device. In some embodiments, the one or more user input devices 108 and/or one or more user output devices 110 are dual-function devices that are configured to both receive user input from the user and display output to the user (e.g., a touch screen display of a display device). For example, the dual function input devices 108 and/or the output devices 110 may present a user interface associated with one or more user device applications 112 (e.g., a graphical user interface) that is configured to receive user input and also provide user output.

The user device 104 comprises computer-readable instructions 120 and data storage 118 stored in the memory device 116, which in one embodiment includes the computer-readable instructions 120 of one or more user applications 122, e.g., a first device application and a second device application, (typically a plurality of user applications 122 such as operating system applications, device applications, third party applications, browser applications, network applications, and the like) that are structured for receiving/displaying an electronic communication and/or that facilitate performance of one or more user activities. In some embodiments, the first device application associated with a first communication medium (e.g., email application medium, social media application medium, etc.) of the one or more user applications 122 of a first user device refers to an application stored on the first user device that is configured to receive and display one or more electronic communications via an associated first user interface, and receive user instructions/input via the associated first user interface. In some embodiments, the second device application associated with a second communication medium (e.g., cellular messaging application medium, internet browser application medium, etc.) of the one or more user applications 122 of a second user device refers to an application stored on the second user device that is configured to receive and display one or more electronic communications via an associated second user interface, and receive user instructions/input via the associated second user interface.

As discussed, in some embodiments, the user device 104 may refer to multiple user devices that may be configured to communicate with the authentication system 107, the processing system 106 and/or the entity system 105 via the network 101. In some embodiment, the processing system 106, the entity system 105 and/or the authentication system 107 may transmit control signals to the user device, configured to cause the user application 122 to perform one or more functions or steps associated with cross-channel electronic communication security with dynamic targeting, as described with respect to FIGS. 2-3, later on.

As further illustrated in FIG. 1, the processing system 106 generally comprises a communication device 136, a processing device 138, and a memory device 140. As used herein, the term "processing device" or "processor" (e.g., processing devices 114, 138 and 148) generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity system 105, the user system 104 and the authentication system 107. As such, the communication device 136 (and/or communication devices 112 and 146) generally comprises a modem, server, or other device for communicating with other devices on the network 101.

As further illustrated in FIG. 1, the processing system 106 comprises computer-readable instructions 142 stored in the memory device 140, which in one embodiment includes the computer-readable instructions 142 of a processing system application 144 (also referred to as cross-channel electronic communication security application or a simulated electronic application configuration application). In some embodiments, the memory device 140 includes data storage 141 (not illustrated) for storing data related to the system environment, but not limited to data created and/or used by the processing system application 144. In some embodiments, the processing system application 144 is configured for cross-channel electronic communication security with dynamic targeting and authentication protocol escalation/elevation triggering. Specifically, executing computer readable instructions of 142 of the processing system application 144 is configured to cause processing device 138 to transmit certain control instructions to the one or more user devices 104 (e.g., 104a-104d) to cause the respective processing devices (114) to carry out one or more steps described herein (e.g., with respect to FIGS. 2-3). Here, the processing system 106 (also referred to as "the system" herein) is configured to provide dynamic construction and targeting of adaptive simulated malicious electronic communications for unsecure communication identification by a user. The processing system 106 is structured for configuring/constructing adaptive simulated malicious electronic communications for interacting with users via user interfaces of the multiple electronic communication media (e.g., multiple electronic communication formats) and user devices 104. The processing system 106 is structured for configuring, dynamically and in real time, a simulated malicious electronic communication for one electronic communication medium, based on and in response to, user actions on another simulated malicious electronic communication on another electronic communication medium. The processing system 106 is also structured for escalating, in real-time, a level of authentication required for the user to execute the user activity based on user actions performed on the simulated malicious electronic communications, among other steps described herein. The processing system 106 may communicate with the entity system 105, the user device 104, the authentication system 107, merchant systems and other third party systems (not illustrated) to perform one or more steps described above and through this disclosure, and/or cause these systems to perform one or more of these steps, at least in part.

In some embodiments, the processing system application 144 may control the functioning of the user device 104. In some embodiments, the processing system application 144 comprises computer readable instructions 142 or computer-readable program code, that when executed by the processing device 138, causes the processing device 138 to perform one or more steps involved in cross-channel electronic communication security with dynamic targeting and/or to transmit control instructions to other systems and devices to cause the systems and devices to perform specific tasks associated with cross-channel electronic communication security with dynamic targeting. In some embodiments, the processing system 106, the authentication system 106 and/or the entity system 105 may be embodied in the same system, or alternatively, the processing system 106, the authentication system 106 and/or the entity system 105 may be separate systems as illustrated by FIG. 1.

As further illustrated in FIG. 1, the authentication system 107 generally comprises a communication device 146, a processing device 148, and a memory device 150. As discussed, as used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the processing system 106, the user system 104 and the entity system 105. As such, the communication device 146 generally comprises a modem, server, or other device for communicating with other devices on the network 101.

As further illustrated in FIG. 1, the authentication system 107 comprises computer-readable instructions 154 stored in the memory device 150, which in one embodiment includes the computer-readable instructions 154 of an authentication application 158. In some embodiments, the memory device 150 includes data storage 152 for storing data related to the system environment, but not limited to data created and/or used by the authentication application 158. In some embodiments, the authentication application 158 provides assessment of authentication requirements for user activities.

In the embodiment illustrated in FIG. 1 and described throughout much of this specification, the authentication application 158 may retrieve user authentication information, financial information based on instructions from the processing system 106. In this way, the authentication application 158 may communicate with the processing system 106, the user device 104, merchant systems and other third party systems (not illustrated).

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a high level process flow 200 for cross-channel electronic communication security with dynamic targeting, in accordance with some embodiments of the invention. In particular, the high level process flow 200 illustrates dynamic construction and targeting of adaptive simulated malicious electronic communications for unsecure communication identification. These steps may be performed by the processing system 106, via the processing system application 144. As alluded to previously, the system is typically configured for facilitating training of users for the purposes of identifying unsecure and malicious electronic communications, and further customizing and tailoring subsequent simulations based on unsuccessful or successful identification of simulated malicious electronic communications by the user.

As discussed, an "electronic communication" may refer to an email, a cellular text message (e.g., Short Message Service (SMS) message, a Multimedia Messaging Service (MMS) message), a social media post (e.g., a public post, a notification, a social media message, etc.), a message associated with a messaging application (e.g., an instant message, etc.), a user device notification, a notification associated with an application of a user device, a pop-up notification, a communication associated with exchanging messages between users/devices using electronic devices, and/or the like. In some embodiments, the electronic communication may refer to an email type electronic communication.

Each type of electronic communication (e.g., email, text message, etc.) is typically associated with a communication medium. A "communication medium" of a particular electronic communication as used herein may refer to or be associated with at least one of the following communication medium components: (i) a message format associated with the electronic communication, (ii) a user application that is compatible with receiving/displaying/acting upon the electronic communication or the user application typically utilized by the user to view/act upon the electronic communication, (iii) a user device associated with receiving/displaying/acting upon the electronic communication or the user device containing the user application for receiving/displaying/acting upon the electronic communication, and (iv) a communication channel for transmitting the electronic communication to a user device. For example, a first electronic communication (e.g., a first simulated electronic communication or a first simulated malicious electronic communication) of an email type may be associated with a first communication medium directed to the following communication medium components corresponding to those listed above: i) an email message format (e.g., a RFC 5322 format, a Multipurpose Internet Mail Extensions or MIME format, a Simple Mail Transfer Protocol (SMTP) format, HTML format, header/subject/content structure and/or the like), (ii) an email web application or a browser application, (iii) a user computing device such as a desktop computer, and (iv) a first communication channel between the processing system 106 and the user computing device comprising a LAN network such as Wi-Fi among others such as a WAN and/or a IAN network. A second electronic communication (e.g., a second simulated electronic communication or a second simulated malicious electronic communication) of a cellular text message type may be associated with a second communication medium directed to the following communication medium components corresponding to those listed above: i) a cellular text message format (e.g., a SS7 protocol format, a Short Message Service format, a Multimedia Messaging Service format, message content structure and/or the like), (ii) a cellular text message application, (iii) a user mobile device such as a mobile phone/smartphone, and (iv) a second communication channel between the processing system 106 and the user computing device comprising a cellular network.

Electronic communications associated with different communication media typically differ with respect to at least one of the foregoing communication medium components. Continuing with the previous example, the communication media of the first electronic communication of the email type and the second electronic communication of the cellular text message type differ with respect to their message formats, user applications utilized for or compatible with receiving/viewing the communication, user devices that the communication are sent to or are configured to be sent to, and the communication channels for transmitting the communications to the respective devices. As another example, communication media of a third electronic communication of an email type and a fourth electronic communication of a social media post type may differ with respect to their message formats (e.g., an email message format and a social media post format, respectively) and user applications utilized for or compatible with receiving/viewing the communication (e.g., a mobile email application and a social media application, respectively). As yet another example, in some embodiments, a first email message and a second email message, although being the same electronic communication type, nevertheless, may comprise different communication media when the first message is structured for, or transmitted to, an email web application or a browser application and the second message is structured for, or transmitted to, a mobile email application of a smartphone. In some instances, the first email message and the second email message, although being the same electronic communication type, may yet comprise different communication media when the first message is structured for, or transmitted to, a first email account of the user associated with a first email application and the second message is structured for, or transmitted to, a second email account of the user associated with a second email application.

As illustrated by block 202, the system may construct a first simulated malicious electronic communication for a user, e.g., for training and testing purposes. As such, the first simulated malicious electronic communication is typically associated with a first electronic communication medium. Typically, the system constructs simulated electronic communications based on or modelled after electronic communications (e.g., those received at the user device and/or at other networked devices) that have been previously identified by the system as malicious. These malicious electronic communications may comprise unauthorized communications such as phish type electronic communications, unsolicited electronic communications (e.g., spam type communications) which may jeopardize the safety and security of user information and user devices.

In some embodiments, the system constructs the simulated electronic communication (e.g., the first simulated malicious electronic communication at block 202, the second simulated malicious electronic communication at blocks 302-308) based on modifying the previously identified malicious communications (e.g., phishing communications, malware etc.) such that the simulated malicious electronic communication resembles the previously identified malicious electronic communication or a malicious electronic communication, while being benign, i.e., not posing a threat to the security of user information or user devices. In some embodiments, the system may construct a template for the simulated malicious electronic communication (e.g., based on analyzing a previously identified malicious electronic communication) and personalize the template based on user specific information for training and testing purposes. It may not be readily apparent to the user that transmitted communication is a simulated electronic communication for training and testing purposes. The user may then analyze the simulated electronic communication and identify whether or not it is malicious. The system may then indicate the successful or unsuccessful identification of the malicious electronic communication, thereby educating/training the user to better identify electronic communications.

In some embodiments, the system constructs the simulated electronic communication based on modifying the previously identified malicious communication by stripping out malicious content, while retaining the structure (e.g., template) and look-and-feel of the malicious communication. Here, the system may identify an unsecure portion of a malicious electronic communication. The unsecure portion typically comprises the malicious content that is associated with an unauthorized activity or causes an unauthorized activity when selected, click-on or otherwise acted upon, which adversely affects the security and safety of user information. Examples of types of unsecure portions may include malicious URLs, malicious attachments, unsolicited or spam electronic communications, URLs or attachments associated with spam, unsecure spoof reply addresses, and the like. Examples of unauthorized or malicious activities/actions may include unauthorized downloads, unauthorized data access/retrieval or interception, deleting data from a user device, sending spam, unauthorized redirecting to untrustworthy sites, presenting unsecure spoof interfaces for the purposes of unauthorized data gathering, and the like. In some embodiments, the system may deploy the malicious electronic communication in an isolated testing environment system of the processing system 106 that is isolated/quarantined/inaccessible from the rest of the processing system 106 and the network environment 100, for analyzing/identifying the malicious content. The system may strip out the unsecure portion from the malicious electronic communication. The system may then construct a simulated unsecure component based on the unsecure portion such that the simulated unsecure component is (i) associated with the predetermined malicious component type (e.g., URL type, attachment type etc.) and (ii) is benign, i.e., not associated with the unauthorized activity. For instance, the system may replace a malicious URL with trusted/whitelisted URL, replace the malicious URL with a placeholder URL, replace at least a portion of the malicious URL with random letters to generate a non-functioning URL, etc., for constructing the simulated unsecure component. For instance, the system may replace a malicious attachment with trusted/whitelisted attachment, replace the malicious attachment with a placeholder attachment, etc., for constructing the simulated unsecure component. The system may then construct the simulated malicious electronic communication by inserting the simulated unsecure component into the first simulated malicious electronic communication in the place of the unsecure portion that was stripped out.

In some embodiments, the simulated electronic communication is transmitted to the user in a manner that the user typically receives electronic communications (e.g., using an email address associated with the user, to a user device that typically receives or is susceptible to the malicious content, etc.) so that it is not readily apparent to the user that a communication maybe malicious solely based on the communication type. In some embodiments, the system may identify a malicious electronic communication associated with an unauthorized activity. The system may then determine an electronic communication medium type (e.g., email, instant message, pop-up window, etc.) associated with the malicious electronic communication. The system may then construct the first simulated malicious electronic communication (or a second simulated malicious electronic communication) such that the first electronic communication medium matches the electronic communication medium type.

In some embodiments, the system may customize the content, type and/or medium of the simulated electronic communication based on identifying cyclic trends in malicious electronic communication. For instance, the system may identify annual cycle comprising a first time period (e.g., October to December) associated with holiday season/shopping type malicious communications, a second time period (e.g., January to April) associated with income tax filing type malicious communications, etc. The system may then proceed to train the user for not only current time period cycles, but also upcoming time periods as well. Here, the system may determine a current time period (e.g., July to September of current Year A) of a current annual communication cycle. In some embodiments, the system may then identify an event (e.g., an annual event during July to September) associated with the current time period. The system may then construct the first simulated malicious electronic communication such that the first simulated malicious electronic communication comprises event data associated with the annual event. Moreover, in some embodiments, the system may then identify an event (e.g., a holiday occurring at November of current Year A) associated with a future time period following the current time period based on a prior annual communication cycle (e.g., previous year B). The system may then construct the first simulated malicious electronic communication such that the first simulated malicious electronic communication comprises event data associated with the future time period (e.g., simulated electronic communications associated with the holiday season) following the current time period.

In some embodiments, the system may customize the content, type and/or medium of the simulated electronic communication based on analyzing user information, user social media information, user activities/purchases, etc., so as to customize the simulations to user.

As indicated by block 204, constructing the first simulated malicious electronic communication may comprises embedding an action tag in a body of the first simulated malicious electronic communication. The action tag is typically structured for determining a predetermined user action associated with the simulated malicious electronic communication. In other words the action tag is structured for identifying user actions with respect to the simulated communication. The user actions may comprise deleting the simulated malicious electronic communication, opening the simulated malicious electronic communication or associated attachments/URLs, moving the simulated malicious electronic communication to another folder or for storage at another location, reading the simulated malicious electronic communication, flagging the simulated malicious electronic communication as malicious, forwarding the simulated malicious electronic communication, ignoring or not acting upon the simulated malicious electronic communication for a predetermined time period, and/or the like. Typically the action tag comprises at least one of a tracking pixel or a JavaScript tag, and/or the like. In some embodiments, the tracking pixel comprises a 1×1 pixel (or pixel tag) that is embedded into the simulated electronic communication. In some embodiments, the action tag is structured such that a user action is configured to trigger the action tag to transmit a user device identifiers (e.g., IP addresses) or message identifiers (e.g., a unique identifier of the simulated malicious electronic communication) to the system 106.

Next, the system may establish a first communication channel with a first user device (e.g., a tablet computer, a smart television, a laptop computer, or the like) of the plurality of networked devices (e.g., user devices 104) associated with the first simulated malicious electronic communication associated with the first electronic communication medium. The first user device may comprise a first user application 122a is stored on the first user device (e.g., device 104b). The first device application 122a may be an application that is configured to receive and present the first simulated malicious electronic communication to the user. Next, as illustrated by block 206, the system transmits, via the first communication channel, the first simulated malicious electronic communication to the first user device.

The user may then analyze the email and identify whether or not it is malicious. Now, referring to block 208, the system may determine, via the embedded action tag, a first user action performed by the user on the first simulated malicious electronic communication. For instance, based on presuming that the first simulated electronic communication is malicious, the user may then perform a first user action of deleting the simulated electronic communication without opening or reading or flagging the simulated electronic communication for analysis by the system. In response to determining the first user action, the system may determine whether the first user action is associated with a successful or unsuccessful identification of the simulated malicious electronic communication.

In response to determining that the user correctly identified the simulated electronic communication (e.g., modelled after a previously identified malicious electronic communication) as malicious, the system typically transmits and/or displays a notification to the user indicating the successful identification. Here, the system may initiate a presentation of a training interface indicating a successful (or unsuccessful) identification of the first simulated malicious electronic communication by the user, as indicated by block 210. For every successful identification, the system may award points to the user.

Similarly, in response to the user incorrectly identifying a simulated electronic communication (e.g., based on a first user action of downloading a simulated malicious attachment, clicking on a simulated malicious URL, forwarding the simulated communication to another user, or ignoring the simulated electronic communication for a predetermined time period), the system typically transmits and/or displays a notification to the user indicating the correct malicious communication identification and may also display portions of the simulated electronic communication that help identify and indicate whether or not it is malicious to help the user in future identifications. Here, the system may determine, via the embedded action tag, that the first user action performed by the user comprising an unsuccessful identification of the first simulated malicious electronic communication. In response, the system may, initiate a presentation of a training interface indicating the unsuccessful identification. The system may further initiate a presentation of the first simulated malicious electronic communication and overlay a graphical element (e.g., highlight, increased brightness, etc.) over a portion of the presentation of the first simulated malicious electronic communication associated with simulated malicious content. In some embodiments, the system is also configured to transmit a notification to a training administrator user/system regarding the successful/unsuccessful identification of malicious communications by the user. This notification may then trigger training administrator user/system to provide customized training to the user, or modify the training communications transmitted to the user, e.g., based on the successful/unsuccessful identification of malicious communications by the user.

FIG. 3 illustrates a high level process flow 300 for cross-channel electronic communication security with dynamic targeting, in accordance with some embodiments of the invention. In particular, the high level process flow 300 illustrates escalation of complexity of future simulated electronic communications, escalation of authentication requirements, etc., in real-time based on user actions associated with simulated electronic communicants of process flow 200 of FIG. 2. These steps may be performed by the processing system 106, via the processing system application 144. As alluded to previously, the system is typically configured for facilitating training of users for the purposes of identifying unsecure and malicious electronic communications, and further customizing and tailoring subsequent simulations based on unsuccessful or successful identification of simulated malicious electronic communications by the user.

As illustrated by block 302 (or in combination with blocks 202-204 and/or 304-308), the system is configured to construct a second simulated malicious electronic communication for the user based on the first user action. In some embodiments, constructing the second simulated malicious electronic communication is substantially similar to that described with respect to blocks 202 and 204 of process flow 200. In some embodiments, separate from in addition to the blocks 202 and 204 of process flow 200, the system may construct the second simulated malicious electronic communication in accordance with one or more of blocks 304, 306 and 308.

In some embodiments, the system may construct the second simulated malicious electronic communication such that at least a portion of the second simulated malicious electronic communication matches the first simulated malicious electronic communication. For example, based on an unsuccessful identification of the first simulated malicious electronic communication by the user at blocks 208-210, the system may construct the second simulated malicious electronic communication similar to the first simulated malicious electronic communication to ensure that the user correctly identifies the communication in the future.

As illustrated block 304, in some embodiments (or in combination with blocks 202-204 and/or 306-308), the system may construct the second simulated malicious electronic communication such that the second simulated malicious electronic communication is associated with a second electronic communication medium, different from the first medium of the first simulated malicious electronic communication. For example, based on a successful (or unsuccessful) identification of the first simulated malicious electronic communication of an email type by the user at blocks 208-210, the system may construct the second simulated malicious electronic communication to be of an instant message type (with same or different content as that of the first simulated malicious electronic communication), to ensure that the user is able to correctly identify the simulated malicious electronic communications across various media/channels.

As illustrated block 306, in some embodiments (or in combination with blocks 202-204, 304 and/or 308), the system may escalate a predetermined complexity of the second simulated malicious electronic communication in comparison with the first simulated malicious electronic communication. In some embodiments, the first simulated malicious electronic communication maybe associated with a first level of complexity, i.e., the first simulated malicious electronic communication maybe structured for causing a simulated unauthorized activity when the user performs a user action of downloading a simulated attachment or clicking on a simulated URL. For instance, based on a successful identification of the first simulated malicious electronic communication by the user, the system may then construct the second simulated malicious electronic communication to comprise an escalated, second, level of complexity, such that the second simulated malicious electronic communication is structured for causing a simulated unauthorized activity when the user merely opens or reads the second simulated malicious electronic communication. In other words, the levels of complexity may be assigned based on an ascending magnitude of adverse impact or ease of triggering of unauthorized activities. In some instances, for example, based on an unsuccessful identification of the first simulated malicious electronic communication by the user, the system may deescalate the complexity of the second simulated malicious electronic communication in comparison with the first simulated malicious electronic communication, in a similar manner as described above.

In some embodiments, the first simulated malicious electronic communication maybe associated with a first level of complexity, i.e., the first simulated malicious electronic communication maybe associated with a spam type communication. For instance, based on a successful identification of the first simulated malicious electronic communication by the user, the system may then construct the second simulated malicious electronic communication to comprise an escalated, second, level of complexity, such that the second simulated malicious electronic communication is associated with an escalated, second level of complexity, such that the second communication is associated with a phish type electronic communication.

In some embodiments, the system may structure the simulated electronic communications (e.g., the first simulated malicious electronic communication at block 202 and/or the second simulated malicious electronic communication at blocks 302-308) modelled based on prior electronic communications received by the user, expected future electronic communications for the user, and/or typical/likely electronic communications received by the user or individuals similar to the user. In some embodiments, the system may construct the simulated electronic communication based on expected future electronic communications for the user. Here, the system may identify a prior user electronic communication received by the user during a predetermined prior first time interval (e.g., a prior online purchase order confirmation email or text message). The system may determine that the prior user electronic communication is associated with a user activity type (e.g., prior online purchase or mobile purchase) and an electronic communication medium type. The system may further identify that the user activity type (e.g., prior online purchase, mobile purchase, etc.) is typically associated with subsequent electronic messages received by the user (e.g., shipping notification emails, shipped order tracking messages, etc.). The system may then identify that the user has initiated a current user activity associated with the user activity type (e.g., a new online purchase) during a second time interval. Based on determining that user has not received an electronic communication of the electronic communication medium type e.g., shipping notification emails, shipped order tracking messages, etc.) which is typically associated with the current user activity, the system may construct the second simulated malicious electronic communication to resemble the expected electronic communication. The second simulated electronic communication is constructed in a manner (e.g. communication type, look-and-feel, communication medium, etc.) that the user typically receives so that it is not readily apparent to the user that a communication maybe malicious solely based on the communication type. For instance, the system may construct shipped order tracking messages as cellular text message type/medium or email type/medium, and not social media posts, because the user typically only receives shipped order tracking messages as cellular text messages or emails.

As such, in some embodiments, the system may construct the second simulated malicious electronic communication by at least modifying the prior user electronic communication to include activity data associated with the current user activity (i.e., replacing data associated with the prior activity) and/or simulated unsecure component constructed in a manner described previously (e.g., at block 202). In other words, the system may construct the second simulated electronic communication to include (i) the simulated unsecure component, and (ii) activity data associated with the current user activity.

As illustrated block 308 (or in combination with blocks 202-204, 304 and/or 306), the system may escalate authentication requirements of the user for access to the second user interface associated with a second user application based on the user's unsuccessful (or successful) identification of the first simulated malicious electronic communication. Here, the system may determine, via the embedded action tag, the first user action performed by the user comprising an unsuccessful identification of the first simulated malicious electronic communication at a first user application. For instance, the system may determine that the user provided user authentication credentials at a simulated malicious interface triggered by clicking on a simulated URL of the first simulated malicious electronic communication, based on incorrectly identifying the first simulated malicious electronic communication as benign. The system may then determine that the user authentication credentials maybe compromised.

Here, in some embodiments, the system may identify that the user seeks to perform a user activity, e.g., a user request for access to a second user interface associated with a second user application (e.g., a financial institution application different from the application associated with viewing the first simulated malicious electronic communication, another entity application, etc.). As discussed, the user activity (e.g., access to the second user interface) typically requires validation of one or more authentication credentials. Typically, execution of the user activity requires validation of one or more authentication credentials, based on the type of activity. In this regard, the user activity may be associated one or more authentication credentials related to an existing level of authentication. For example, a user activity comprising accessing a mobile device application may be require authentication using a username and password. The credentials of username and password may be associated with a first level of authentication. As another example, another user activity comprising initiating a purchase using a user application may require credentials with a second, higher level of authentication, for example payment instrument identifiers and their associated personal identification numbers (PIN).

In some embodiments, the request comprises the user accessing or opening an application associated with the activity, via the second user device. For example, the user opening a mobile banking application (second device application) to view account balances or opening a page within the application to modify account preferences. In some embodiments, the request comprises receiving the existing/ default authentication credentials from the user. In some embodiments, the system constantly monitors the user's devices and activities based on requisite permissions from the user, and the subsequent steps are triggered, automatically, in response to the system identifying that the user seeks to execute the user activity. For example, the system may identify that the user seeks to initiate a purchase (user activity) based on determining that the user has initiated a check-out step for purchasing one or more products using a merchant application (second device application).

However, the existing level or authentication or default authentication, associated with the activity itself, may not be satisfactory in instances where the user may be potentially exposed to misappropriation or in instances where chances of unauthorized access to the user's personal and financial information is heightened, e.g., unsuccessful identification of malicious electronic communications. The system may then escalate, in real-time, authentication requirements of the user for executing the user activity (e.g., access to the second user interface) based on the unsuccessful identification of the first simulated malicious electronic communication (e.g., in accordance with the authentication continua of FIGS. 4A-4D). Here, in some embodiments, the system may prevent check-out, dissuade input of personal information, lock the display screen of the device or otherwise suspend certain functionality associated with the merchant application and/or the mobile device, until the requirement of escalated authentication is ascertained and/or authentication credentials associated with escalated levels of authentication are validated. In this regard, the system may be overarching and may be configured to control one or more applications, operating system, user interface and other functionality associated with the second user device, based on receiving prior authorization from the user.

The system may ascertain the escalated higher authentication level required based on the identified incorrect identification of the simulated communication. Alternately, in some embodiments, the system may limit the permissible functions for the given default level of authentication based on the unsuccessful identification of the first simulated malicious electronic communication. For example, the system may only allow the user to view account balances, but may block payments/transactions.

Typically, the user authentication is associated with multiple, predetermined levels of authentication, based on the functions that are permitted for the given authentication level. For example, a lowest level of authentication may be sufficient to execute certain functions/activities like opening an application, viewing predetermined content and the like. A higher level of authentication may be required for other functions like modifying content, performing purchases. Typically, the level of authentication may be associated with one or more types of authentication credentials. For example, a low level of authentication may be associated with authentication credential types like a passcode, a swipe gesture, or no requirement for credentials at all. A moderate level of authentication may be associated with authentication credentials types like a username accompanied by an alphanumeric password, an account identifier along with an expiration date and the like. A high level of authentication may be associated with authentication credential types like biometric information (fingerprint scans, iris scans/facial recognition, voice recognition and the like), username accompanied by a one-time passcode generated/provided on another linked user device and the like. In some embodiments, the authentication level may be escalated using a combination of the authentication credential types. For example, the authentication level of a username-passcode authentication may be increased to a higher level with the user providing additional out of wallet credentials like predefined security questions, user contact information, identification information and the like. There may be multiple levels of authentication (3, 10, 15, or the like), with each level being associated with a numeric, alphabetic, visual or another suitable identifier.

In some embodiments, the system may determine whether current user security features meet the escalated authentication requirement for the user activity. The system may determine one or more types of new security features that meet the escalated authentication requirement and subsequently enable the user to modify the current user security features based on the determined new security features. As described previously, the system may block functionality associated with the user device (e.g., mobile phone), until successful validation of escalated authentication credentials received from the user, (ii) the user successfully identifies the first simulated malicious electronic communication, and/ or (iii) the user successfully identifies the second simulated malicious electronic communication. The system may enable the user to execute the user activity based on receiving a positive authentication response at the second device application of the second user device.

In some embodiments, the second user interface is associated with the second electronic communication medium. Here, transmitting the second simulated malicious electronic communication to the user comprises presenting the second simulated malicious electronic communication via the second user interface.

Next, at block 310, the system may transmit, via a second communication channel associated with the second electronic communication medium, the second simulated malicious electronic communication to the user. The system is configured to establish a second operative communication link with a second user device (e.g., a smart phone device, or the like) of the plurality of networked devices (e.g., user devices 104). As discussed the second user device is associated with the user and comprises another device application 122b associated with a second medium structured for viewing/receiving/acting upon the second electronic communication medium. At block 312, the system may initiate a presentation of the training interface indicating a successful or unsuccessful identification of the second simulated malicious electronic communication by the user, in a manner similar to that described with respect to blocks 208-210.

As alluded to previously, the user is typically required to authenticate their identity in order to complete a user activity (e.g., an electronic transaction). Numerous types and levels of user authentication exist. For example, a user may authenticate their identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In some embodiments, the identity of the device being used by the user may be used to authenticate the identity of the user. The different types of authentication may provide differing degrees of confidence regarding the authentication using such types and thereby provide different levels of authentication. For example, if a username by itself is used for a first user authentication, and a username along with a password is used for a second authentication, then the second authentication should provide a higher confidence regarding the authentication because of the additional layer of authentication required. Therefore the second authentication is at a higher authentication level. Further, within the types of authentication, varying levels of confidence may be used. For example, when using a password, an administrator may require users to create a password according to strict rules designed to increase the security level of the password, and therefore increase the confidence/level of any authentication using the password.

Accordingly, a continuum of authentication may be used to quantify (or dictate) the levels of authentication. Likewise, a continuum of functions permitted may be used to quantify (or dictate) the number or context in which functions (e.g., types of activities) are permitted.

Referring to FIG. 4A, a continuum of authentication 400A is illustrated according to embodiments of the invention. On the left-hand side of the continuum, a "zero authentication"/lowest level of authentication requires no authentication credentials. On the right-hand side of the continuum, a "hard authentication"/highest level of authentication requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 4C, the continuum of authentication 400A may be coupled with a functions permitted continuum 400B, first illustrated in FIG. 4B.

Referring to FIG. 4B, the functions permitted continuum 400B illustrates various levels of functions (e.g., electronic activities) permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 400B corresponds with a certain amount and/or number of functions that are permitted and/or the context in which certain functions are permitted.

Referring now to FIG. 4C, a diagram 400C illustrates a coupling of the functions permitted continuum 400B and the levels of authentication continuum 400A. As shown, the continua 400B and 400A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 400B provides that a particular function or functions may be permitted given that a specified level of authentication credentials are supplied, as indicated by the corresponding point on continuum 400A. For example, the system, a financial institution and/or a user may arrange the continua 400B and 400A with respect to one another and may adjust the arrangement based on changing desires or goals.

In some embodiments, one or both the continua 400B and 400A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention. As noted, the level of authentication required to complete an electronic activity may be increased or decreased based on exposure events such as incorrect identification of malicious communications by the user. For example, if the user is typically required to provide a username and password to complete a type of activity, but the level of authentication required is increased in accordance with block 308, then the user may be prompted to provide additional (e.g., secondary) authentication information, such as a PIN or a zip code associated with the user.

Referring now to FIG. 4D, a diagram 400D illustrates a relationship between the functions permitted and the authentication types. As shown in FIG. 4D, the soft authentication continuum between zero authentication and hard authentication may include one or more authentication types (A, B, C in the Figure). In one aspect, the one or more authentication types corresponding to the one or more authentication credentials received from the user and one or more functions are positively correlated. In one aspect, the user may have to provide authentication credentials corresponding to authentication types A and B to perform moderate functions. In another aspect, the user may have to provide authentication credentials corresponding to authentication types A, B, and C to perform most functions. In yet another aspect, the user may have to only provide authentication credentials corresponding to authentication type A to perform minimal functions. For example, a username may enable the user to gain access to checking balance via an online banking application, a username and password may enable the user to gain access to checking balance, funds transfer between the user's first bank account and second bank account, and downloading previous statements, and a username, password and challenge question may enable the user to gain complete access to all the functions of an online banking transaction. By way of further example, the user may need to provide the zip code associated with the user's account in order for the user to complete a mobile wallet transaction that exceeds a defined threshold.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for cross-channel electronic communication security, wherein the system provides dynamic construction and targeting of adaptive simulated malicious electronic communications for unsecure communication identification, the system comprising:
   a memory device with computer-readable program code stored thereon;
   a communication device, wherein the communication device establishes operative communication with a plurality of networked devices via a communication network;
   a processing device operatively coupled to the memory device and the communication device, wherein the processing device executes the computer-readable program code to:
      construct a first simulated malicious electronic communication for a user, wherein the first simulated malicious electronic communication is associated with a first electronic communication medium, wherein constructing the first simulated malicious electronic communication comprises:
         embedding an action tag in a body of the first simulated malicious electronic communication, wherein the action tag is structured for determining a predetermined user action associated with the first simulated malicious electronic communication;
      transmit, via a first communication channel, the first simulated malicious electronic communication to a first user device associated with the first electronic communication medium;
      determine, via the embedded action tag, a first user action performed by the user on the first simulated malicious electronic communication;
      construct a second simulated malicious electronic communication for the user based on the first user action, wherein constructing the second simulated malicious electronic communication comprises constructing the second simulated malicious electronic communication such that the second simulated malicious electronic communication is associated with a second electronic communication medium; and
      transmit, via a second communication channel associated with the second electronic communication medium, the second simulated malicious communication to the user.

2. The system of claim 1, wherein the action tag comprises a tracking pixel.

3. The system of claim 1, wherein the processing device executes the computer-readable program code to:
   identify an unsecure portion of a malicious electronic communication, wherein the unsecure portion is associated with an unauthorized activity, wherein the unsecure portion is associated with a predetermined malicious component type; and
   construct a simulated unsecure component based on the unsecure portion such that the simulated unsecure component is (i) associated with the predetermined malicious component type and (ii) not associated with the unauthorized activity;
   wherein constructing the first simulated malicious electronic communication further comprises inserting the simulated unsecure component into the first simulated malicious electronic communication.

4. The system of claim 1, wherein the processing device executes the computer-readable program code to:
   identify a malicious electronic communication associated with an unauthorized activity;
   determine an electronic communication medium type associated with the malicious electronic communication; and
   wherein constructing the first simulated malicious electronic communication further comprises constructing the first simulated malicious electronic communication such that the first electronic communication medium matches the electronic communication medium type.

5. The system of claim 1, wherein the processing device executes the computer-readable program code to:
   determine a current time period of a current annual communication cycle;
   identify an event associated with a future time period following the current time period based on a prior annual communication cycle; and
   wherein constructing the first simulated malicious electronic communication further comprises constructing the first simulated malicious electronic communication such that the first simulated malicious electronic communication comprises event data associated with the future time period following the current time period.

6. The system of claim 1, wherein constructing the second simulated malicious electronic communication based on the first user action further comprises constructing the second simulated malicious electronic communication such that at least a portion of the second simulated malicious electronic communication matches the first simulated malicious electronic communication.

7. The system of claim 1, wherein constructing the second simulated malicious electronic communication based on the first user action further comprises escalating a predetermined complexity of the second simulated malicious electronic communication.

8. The system of claim 7, wherein the first simulated malicious electronic communication is associated with a spam type communication, wherein escalating the predetermined complexity of the second simulated malicious electronic communication further comprises constructing the second simulated malicious electronic communication such that the second simulated malicious electronic communication is associated with a phish type electronic communication.

9. The system of claim 7, wherein escalating the predetermined complexity of the second simulated malicious electronic communication further comprises:
   identifying a prior user electronic communication received by the user during a predetermined prior first time interval;
   determining that the prior user electronic communication is associated with a user activity type and an electronic communication medium type;
   identifying that the user has initiated a current user activity associated with the user activity type during a second time interval; and
   based on determining that user has not received an electronic communication of the electronic communication medium type associated with the current user activity, constructing the second simulated malicious electronic communication by at least modifying the prior user electronic communication to include activity data associated with the current user activity.

10. The system of claim 7, wherein escalating the predetermined complexity of the second simulated malicious electronic communication further comprises:
identifying an unsecure portion of a malicious electronic communication, wherein the unsecure portion is associated with an unauthorized activity, wherein the unsecure portion is associated with a predetermined malicious component type;
constructing a simulated unsecure component based on the unsecure portion such that the simulated unsecure component is (i) associated with the predetermined malicious component type and (ii) not associated with the unauthorized activity;
wherein constructing the second simulated malicious electronic communication comprises constructing the second simulated electronic communication to include (i) the simulated unsecure component, and (ii) activity data associated with the current user activity.

11. The system of claim 1, wherein constructing the second simulated malicious electronic communication based on the first user action, further comprises:
determining, via the embedded action tag, the first user action performed by the user comprising a unsuccessful identification of the first simulated malicious electronic communication at a first user application;
identifying a user request for access to a second user interface associated with a second user application; and
escalating authentication requirements of the user for access to the second user interface based on the unsuccessful identification of the first simulated malicious electronic communication.

12. The system of claim 11, wherein the second user interface is associated with the second electronic communication medium, wherein transmitting the second simulated malicious electronic communication to the user comprises presenting the second simulated malicious electronic communication via the second user interface.

13. The system of claim 1, wherein the processing device executes the computer-readable program code to:
in response to determining the first user action performed by the user on the first simulated malicious electronic communication, initiate a presentation of a training interface indicating a successful or unsuccessful identification of the first simulated malicious electronic communication by the user.

14. The system of claim 1, wherein the processing device executes the computer-readable program code to:
determine, via the embedded action tag, the first user action performed by the user comprising a unsuccessful identification of the first simulated malicious electronic communication; and
in response to determining the unsuccessful identification of the first simulated malicious electronic communication, initiate a presentation of a training interface indicating the unsuccessful identification of the first simulated malicious electronic communication by the user, comprising:
initiating a presentation of the first simulated malicious electronic communication; and
overlaying a graphical element over a portion of the presentation of the first simulated malicious electronic communication associated with simulated malicious content.

15. A computer program product for cross-channel electronic communication security, wherein the computer program product provides dynamic construction and targeting of adaptive simulated malicious electronic communications for unsecure communication identification, the computer program product comprising a non-transitory computer-readable storage medium having computer-executable instructions for causing a computer processor to:
construct a first simulated malicious electronic communication for a user, wherein the first simulated malicious electronic communication is associated with a first electronic communication medium, wherein constructing the first simulated malicious electronic communication comprises:
embedding an action tag in a body of the first simulated malicious electronic communication, wherein the action tag is structured for determining a predetermined user action associated with the first simulated malicious electronic communication;
transmit, via a first communication channel, the first simulated malicious electronic communication to a first user device associated with the first electronic communication medium;
determine, via the embedded action tag, a first user action performed by the user on the first simulated malicious electronic communication;
construct a second simulated malicious electronic communication for the user based on the first user action, wherein constructing the second simulated malicious electronic communication comprises constructing the second simulated malicious electronic communication such that the second simulated malicious electronic communication is associated with a second electronic communication medium; and
transmit, via a second communication channel associated with the second electronic communication medium, the second simulated malicious electronic communication to the user.

16. The computer program product of claim 15, wherein the action tag comprises a tracking pixel.

17. The computer program product of claim 15, wherein constructing the second simulated malicious electronic communication based on the first user action, further comprises:
determining, via the embedded action tag, the first user action performed by the user comprising a unsuccessful identification of the first simulated malicious electronic communication at a first user application;
identifying a user request for access to a second user interface associated with a second user application; and
escalating authentication requirements of the user for access to the second user interface based on the unsuccessful identification of the first simulated malicious electronic communication.

18. A computerized method for cross-channel electronic communication security, wherein the computerized method provides dynamic construction and targeting of adaptive simulated malicious electronic communications for unsecure communication identification, the computerized method comprising:
constructing a first simulated malicious electronic communication for a user, wherein the first simulated malicious electronic communication is associated with a first electronic communication medium, wherein constructing the first simulated malicious electronic communication comprises:
embedding an action tag in a body of the first simulated malicious electronic communication, wherein the action tag is structured for determining a predetermined user action associated with the first simulated malicious electronic communication;

transmitting, via a first communication channel, the first simulated malicious electronic communication to a first user device associated with the first electronic communication medium;

determining, via the embedded action tag, a first user action performed by the user on the first simulated malicious electronic communication;

constructing a second simulated malicious electronic communication for the user based on the first user action, wherein constructing the second simulated malicious electronic communication comprises constructing the second simulated malicious electronic communication such that the second simulated malicious electronic communication is associated with a second electronic communication medium; and transmitting, via a second communication channel associated with the second electronic communication medium, the second simulated malicious electronic communication to the user.

19. The computerized method of claim 18, wherein the action tag comprises a tracking pixel.

20. The computerized method of claim 18, wherein constructing the second simulated malicious electronic communication based on the first user action, further comprises:

determining, via the embedded action tag, the first user action performed by the user comprising a unsuccessful identification of the first simulated malicious electronic communication at a first user application;

identifying a user request for access to a second user interface associated with a second user application; and escalating authentication requirements of the user for access to the second user interface based on the unsuccessful identification of the first simulated malicious electronic communication.

* * * * *